(12) United States Patent  (10) Patent No.: US 11,605,005 B2
Himeno                     (45) Date of Patent:     Mar. 14, 2023

(54) KNOWLEDGE MANAGEMENT SYSTEM (71) Applicant: IRYOU JYOUHOU GIJYUTU KENKYUSHO CORPORATION, Fukuoka (JP)

(72) Inventor: Shinkichi Himeno, Fukuoka (JP)

(73) Assignee: IRYOU JYOUHOU GIJYUTU KENKYUSHO CORPORATION, Fukuoka (JP)

( * ) Notice: Subject to any disclaimer, the term of this patent is extended or adjusted under 35 U.S.C. 154(b) by 465 days.

(21) Appl. No.: 16/758,023

(22) PCT Filed: Nov. 22, 2018

(86) PCT No.: PCT/JP2018/043100
§ 371 (c)(1),
(2) Date: Apr. 21, 2020

(87) PCT Pub. No.: WO2019/107259
PCT Pub. Date: Jun. 6, 2019

(65) Prior Publication Data
US 2020/0320405 A1    Oct. 8, 2020

(30) Foreign Application Priority Data

Nov. 29, 2017 (JP) .............................. JP2017-228575

(51) Int. Cl.
*G06N 5/02* (2023.01)
*G06F 16/27* (2019.01)
(Continued)

(52) U.S. Cl.
CPC ........... *G06N 5/02* (2013.01); *G06F 16/2246* (2019.01); *G06F 16/245* (2019.01); *G06F 16/27* (2019.01)

(58) Field of Classification Search
CPC ...... G06N 5/02; G06N 5/022; G06F 16/2246; G06F 16/245; G06F 16/27; G06F 16/273;
(Continued)

(56) References Cited

U.S. PATENT DOCUMENTS

2012/0007238 A1   1/2012 Takahashi
2017/0016916 A1   1/2017 Wang et al.
(Continued)

FOREIGN PATENT DOCUMENTS

CN   108428202 A   *   8/2018   ........... A61B 5/0205
CN   110019693 A   *   7/2019   ............. G06Q 10/04
(Continued)

OTHER PUBLICATIONS

English Translation of ISR from PCT/JP2018/043100 dated Feb. 26, 2019 (2 pages).

*Primary Examiner* — Dung K Chau
(74) *Attorney, Agent, or Firm* — Calfee Halter & Griswold LLP

(57) ABSTRACT

By clearly separating knowledge of a specific area into a plurality of knowledge trees and organizing it, it is possible to describe systematic knowledge without fluctuation of notation.

Knowledge tree group management means that manages at least one knowledge tree, and knowledge entry management means that manages at least one knowledge entry existing for each of the knowledge trees are provided. Each of the knowledge entries includes a knowledge entry attribute (Continued)

description describing an attribute related to the knowledge entry and a knowledge entry parent-child relationship link describing a parent-child relationship with another knowledge entry of the knowledge tree. The knowledge entry attribute description includes a reference link to a knowledge entry belonging to a different or an identical knowledge tree or to an entry attribute description of the knowledge entry.

13 Claims, 10 Drawing Sheets

(51) Int. Cl.
  *G06F 16/245* (2019.01)
  *G06F 16/22* (2019.01)
(58) Field of Classification Search
  CPC ... G06F 16/275; G06F 16/278; G06F 16/9024
  USPC .......................................................... 706/50
  See application file for complete search history.

(56) References Cited

U.S. PATENT DOCUMENTS

| | | | | |
|---|---|---|---|---|
| 2017/0235848 | A1* | 8/2017 | Van Dusen | G06N 5/02 705/12 |
| 2021/0211468 | A1* | 7/2021 | Griffin | H04L 63/20 |

FOREIGN PATENT DOCUMENTS

| | | | | |
|---|---|---|---|---|
| JP | 2002-334112 | A | 11/2002 | |
| JP | 2012-033181 | A | 2/2012 | |
| JP | 2012-119004 | A | 6/2012 | |
| JP | 2013-105401 | A | 5/2013 | |
| JP | 2015-099614 | A | 5/2015 | |
| JP | 2016-042308 | A | 3/2016 | |
| JP | 6637166 | B2 * | 1/2020 | H04L 67/02 |
| WO | WO-2005089238 | A2 * | 9/2005 | G06F 17/50 |
| WO | WO-2007016717 | A1 * | 2/2007 | G06N 5/025 |
| WO | 2015/186205 | A1 | 12/2015 | |

* cited by examiner

FIG. 1

"DISEASE NAME" KNOWLEDGE TREE

"SYMPTOMS/FINDINGS" KNOWLEDGE TREE

"MEDICINE" KNOWLEDGE TREE

FIG. 2

KNOWLEDGE TREE GROUP
MANAGEMENT MEANS

| KNOWLEDGE TREE ID | KNOWLEDGE TREE NAME |
|---|---|
| 1 | DISEASE NAME |
| 2 | SYMPTOMS/ FINDINGS |
| 3 | MEDICINE |
| 4 | TREATMENT |
| ⋮ | ⋮ |

KNOWLEDGE ENTRY MANAGEMENT MEANS

| KNOWLEDGE TREE ID | KNOWLEDGE ENTRY ID | KNOWLEDGE ENTRY NAME |
|---|---|---|
| 1 | 1 | DISEASE NAME |
| 1 | 2 | METABOLIC SYSTEM |
| 1 | 3 | DIGESTIVE SYSTEM |
| 1 | 4 | LOCOMOTOR SYSTEM |
| 1 | 5 | CIRCULATORY SYSTEM |
| ⋮ | ⋮ | ⋮ |

FIG. 5

PARENT-CHILD RELATIONSHIP LINK AND KNOWLEDGE ENTRY
ATTRIBUTE DESCRIPTION OF "DIABETES" KNOWLEDGE ENTRY

FIG. 6

EXAMPLE OF KNOWLEDGE ENTRY
ATTRIBUTE CATEGORY MANAGEMENT MEANS

| KNOWLEDGE TREE ID | KNOWLEDGE ENTRY ATTRIBUTE CATEGORY ID | KNOWLEDGE ENTRY ATTRIBUTE CATEGORY NAME |
|---|---|---|
| 1 | 1 | ETIOLOGY |
| 1 | 2 | PATHOLOGY |
| 1 | 3 | SYMPTOMS |
| 1 | 4 | EXAMINATION FINDINGS |
| 1 | 5 | TREATMENT |
| 1 | 6 | CASE |
| 1 | 7 | LITERATURE |
| ⋮ | ⋮ | ⋮ |

FIG. 7

(a) REFERENCE LINK LABEL

HYPERGLYCEMIA  LINK TO "HYPERGLYCEMIA" KNOWLEDGE ENTRY TO "SYMPTOMS/FINDINGS" KNOWLEDGE TREE (b) "MEDICINE" KNOWLEDGE TREE (C) DISC HERNIATION

FIG. 8

"MEDICAL TREATMENT" NAMESPACE

DISEASE NAME, SYMPTOMS/FINDINGS, MEDICINE ...

"ART" NAMESPACE

MUSIC, PICTURE, DRAMA ..

"INDUSTRY" NAMESPACE

SERVICE INDUSTRY, MANUFACTURING INDUSTRY,
AGRICULTURE, FORESTRY, AND FISHERIES INDUSTRY ...

FIG. 9

NAMESPACE MANAGEMENT MEANS

| NAMESPACE ID | NAMESPACE NAME |
|---|---|
| 1 | MEDICAL TREATMENT |
| 2 | ART |
| 3 | INDUSTRY |
| 4 | ⋮ |
| ⋮ | ⋮ |

FIG. 10

KNOWLEDGE MANAGEMENT SYSTEM

CROSS-REFERENCE TO RELATED APPLICATIONS

This application is a 371 of PCT Application No. PCT/JP2018/043100 filed on Nov. 22, 2018, which claims priority to Japanese Application No. 2017-228575, filed on Nov. 29, 2017, the contents of which are hereby incorporated by reference as if recited in their entirety.

TECHNICAL FIELD

The present invention relates to a knowledge management system for efficiently accumulating and searching for knowledge required for inference, decision, recognition, and the like.

BACKGROUND ART

If it is possible to allow a computer to make decision and inference that are made daily by a person, a large amount of daily tasks can be processed at high speed or simplified. Development for this has been done conventionally.

Initially, an expert system has been developed in which decision rules such as "if A then B" and "if B then C" are accumulated, and when a proposition "D is A" is given, "D is C" is inferred by sequentially applying the previously accumulated decision rules. "MYCIN" which infers the best antibiotics for infectious diseases is known.

In the age of the Internet, more flexible searches have been required. For example, using records and announcements on the web such as "E is a violinist", "a violinist is a musician", "a conductor is a musician", etc., a question "Is E a musician?" is answered (semantic web).

Here, subordinate concepts such as "violinist", "conductor", and "composer" are developed under a superordinate concept such as "musician". In this way, by describing the concepts structurally (ontology), even if there is no direct description on the web that "E is a musician", "E is a violinist and therefore a musician" is inferred, and the above question can be answered correctly.

Here, it is necessary to describe individual concepts and relationships in a unified style using a format such as XML so that concepts in various fields can be searched across. RDF (Resource Description Framework) has been proposed as an example of this unified style. A method of describing concepts and relationships for each individual fragment is compatible with a programming language such as Prolog and is easy to become familiar with a relational database.

In a medical field, an attempt has been made to construct a disease ontology as shown in Non Patent Literature 1 below. Further, Patent Literature 1 and the like have also been proposed in a field of general industry.

CITATION LIST

Patent Literature

Patent Literature 1: JP 2012-119004 A

Non Patent Literature

Non Patent Literature 1: Ontology expression and utilization of clinical medical knowledge (http://www.sanken.osaka-u.ac.jp/labs/nano/contents/meeting/pdf/S12_ohe.pdf)

SUMMARY OF INVENTION

Technical Problem

In an early expert system, it is difficult to accumulate a large number of decision rules necessary for practical operation. Also, since a condition part A of "if A then B" is adopted only to an exactly matching case, if "violinist" is searched for "musician" as in the above example, nothing is applicable.

In the semantic web, according to a structural description such as ontology, a certain degree of ambiguous search has become available by making use of so-called common sense that "violinist", "conductor", "composer", etc. are also included in a subordinate concept of "musician". However, when concrete ontology is actually constructed, since a degree of freedom in description style is too large, a plurality of description styles is possible even with the same contents, and a structure described by a constructor fluctuates. For this reason, even if the contents are the same, the description styles are often different. For this reason, when a plurality of ontologies is constructed by a plurality of people in parallel, confusion arises due to inconsistencies in the description style. In addition, since various description methods are mixed, it is often difficult to understand easily by looking at a developed ontology, and readability is often poor.

On the other hand, even when knowledge fragments such as individual knowledge areas, knowledge items, attribute descriptions, and parent-child relationship descriptions are described in a style such as RDF, similar fluctuation of description style is inevitable. Since they are in the first place a large number of enumerated knowledge fragments, a whole picture of knowledge cannot be looked through, and readability is extremely poor.

In order to efficiently describe a large amount of knowledge, it is needless to say that a form can be understood by a computer, and it also needs to have readability that can be easily understood by a person. As recommended in WEB 2.0, ability to easily describe knowledge without special knowledge and skills and ability to easily point out inconsistencies at a glance are essential properties for many people who have knowledge in certain fields and are not experts in computers to simultaneously construct ontologies and the like while cooperating via the web.

The present invention has been made to solve such conventional problems, and an object of the present invention is to enable a systematic description of knowledge without fluctuation of notation by clearly separating knowledge of a certain area into a plurality of knowledge trees and organizing it, making each knowledge tree develop knowledge entries constituting the tree in a parent-child relationship hierarchical structure, making each knowledge entry have a set of entry attribute descriptions related to the knowledge entry, and making the entry attribute description include a reference link to another knowledge entry or to an entry attribute description.

Furthermore, it is to eliminate a need to duplicate and describe an attribute description by inheriting an entry attribute description of a parent knowledge entry by a child knowledge entry.

For another area, it is to enable concentration on an area of interest without worrying about duplication of knowledge trees and knowledge entry names in the other area by enabling management of another independent knowledge tree group separated by a namespace.

By establishing such a framework of knowledge management, it is to construct a knowledge management system that not only enables machine processing but also has good readability that allows contents to be viewed by a person and does not have fluctuation of description no matter who creates it, and to provide a base of knowledge processing that enables flexible and advanced search and inference.

In addition, it is to enable flexible operation of the knowledge management system by enabling reconfiguration of the knowledge management system such that a part or all of the knowledge management system is extracted and integrated into another knowledge management system.

Further, it is to enable effective use in the real world by enabling not only browsing of contents of a constructed knowledge management system, but also inquiries to the knowledge management system and responses from the knowledge management system. Furthermore, it is to ensure security against destruction and confusion by managing user's execution authority and allowing a search scope to be set.

Solution to Problem

As means for achieving the above objects, a knowledge management system according to claim 1, in recording and managing knowledge, includes: knowledge tree group management means that manages at least one knowledge tree; and knowledge entry management means that manages at least one knowledge entry existing for each of the knowledge trees, in which each of the knowledge entries includes a knowledge entry attribute description describing an attribute related to the knowledge entry, and a knowledge entry parent-child relationship link describing a parent-child relationship with another knowledge entry of the knowledge tree, and the knowledge entry attribute description includes a reference link to a knowledge entry belonging to a different or an identical knowledge tree or to an entry attribute description of the knowledge entry.

A knowledge management system according to claim 2, in the knowledge management system according to claim 1, further includes knowledge entry attribute category management means that manages the knowledge entry attribute description by dividing it into categories.

A knowledge management system according to claim 3, in the knowledge management system according to claim 1 or 2, further includes knowledge entry attribute description inheriting means that inherits an entry attribute description of a parent knowledge entry to an entry attribute description of a child knowledge entry in the parent-child relationship.

A knowledge management system according to claim 4, in the knowledge management system according to any one of claims 1 to 3, further includes reference characteristic management means that manages reference strength and a script to be executed upon reference in the reference link.

In a knowledge management system according to claim 5, in the knowledge management system according to claim 4, the reference strength is changed according to observation frequency in the reference characteristic management means.

A knowledge management system according to claim 6, in the knowledge management system according to any one of claims 1 to 5, further includes external document reference means that refers to an external document or an external document group related to the entry attribute description in the reference link.

A knowledge management system according to claim 7, in the knowledge management system according to any one of claims 1 to 6, further includes namespace management means that manages a plurality of knowledge tree groups by dividing it by a namespace in the knowledge tree group management means.

A knowledge management system according to claim 8, in the knowledge management system according to any one of claims 1 to 7, further includes knowledge export means that extracts any part of a namespace, a knowledge tree, a knowledge entry, an entry attribute description, a parent-child relationship link constituting the knowledge management system to create a knowledge management subset, and exports the knowledge management subset to another knowledge management system.

A knowledge management system according to claim 9, in the knowledge management system according to any one of claims 1 to 8, further includes knowledge import means that imports the knowledge management subset extracted by the knowledge export means or the knowledge management subset from a separately constructed knowledge management system, and reconfigures a namespace, a knowledge tree, a knowledge entry, an entry attribute description, and a parent-child relationship link.

A knowledge management system according to claim 10, in the knowledge management system according to any one of claims 1 to 9, further includes user authority management means that manages execution authority for creating, editing, deleting, and referring functions of each of the namespace, the knowledge tree, the knowledge entry, the knowledge entry attribute category, the knowledge entry attribute description, and the parent-child relationship link for each user.

A knowledge management system according to claim 11, in the knowledge management system according to any one of claims 1 to 10, further includes knowledge browsing means that browses a parent-child relationship between the knowledge entries and contents of a knowledge attribute description of the knowledge entry in the knowledge management system.

A knowledge management system according to claim 12, in the knowledge management system according to any one of claims 1 to 11, further includes: knowledge inquiry receiving means that receives an inquiry about recorded and managed contents; and a knowledge inquiry response means that responds to contents of the inquiry in the knowledge management system.

A knowledge management system according to claim 13, in the knowledge management system according to any one of claims 1 to 12, further includes search scope management means that manages a creation user of each of the namespace, the knowledge tree, the knowledge entry, the entry attribute description, the parent-child relationship link, and excludes a part of the knowledge management system created by a specific user or user group from a search target range of the browsing and the knowledge inquiry or, conversely, sets only a part of the knowledge management system created by a specific user or user group as a search target range of the browsing and the knowledge inquiry.

Advantageous Effects of Invention

Since the knowledge management system according to claim 1 includes a knowledge tree group management means that manages at least one knowledge tree and a knowledge entry management means that manages at least one knowledge entry existing for each of the knowledge trees, knowledge in a specific area is clearly separated and managed in each knowledge tree, and the knowledge entries constituting the tree are developed and managed in a hierarchical structure in each knowledge tree.

Since each knowledge entry includes a knowledge entry attribute description describing an attribute related to the knowledge entry and a knowledge entry parent-child relationship link describing a parent-child relationship with another knowledge entry of the knowledge tree, it is possible to describe systematic knowledge without fluctuation of notation.

Since the knowledge entry attribute description includes a reference link to a knowledge entry belonging to a different or an identical knowledge tree or to an entry attribute description of the knowledge entry, it is possible to refer to appropriate information of a link destination.

Since the knowledge management system according to claim 2 further includes knowledge entry attribute category management means that manages the knowledge entry attribute description by dividing it into categories, the knowledge entry attribute description is appropriately managed for each category.

Since the knowledge management system according to claim 3 further includes knowledge entry attribute description inheriting means that inherits an entry attribute description of a parent knowledge entry to an entry attribute description of a child knowledge entry in the parent-child relationship, a common attribute description is grouped into the parent knowledge entry, and the child knowledge entry requires only a minimal attribute description.

Further, all the attribute descriptions of the knowledge entry corresponding to the parent of the knowledge entry are inherited and displayed, and it is easy to grasp the attribute descriptions comprehensively.

Since the knowledge management system according to claim 4 further includes reference characteristic management means that manages reference strength and a script to be executed upon reference in the reference link, it is possible to perform Bayesian estimation or the like in accordance with a situation, a check mistake is prevented, and safety of medical treatment is improved.

In the knowledge management system according to claim 5, since the reference strength is changed according to observation frequency in the reference characteristic management means, it is possible to perform the Bayesian estimation or the like more suited to the situation.

Since the knowledge management system according to claim 6 further includes external document reference means that refers to an external document or an external document group related to the entry attribute description in the reference link, it is possible to refer to a related book, file, or a document on the Web.

Since the knowledge management system according to claim 7 further includes namespace management means that manages a plurality of knowledge tree groups by dividing it by a namespace in the knowledge tree group management means, the namespace is set for each area. As a result, knowledge tree names in other areas are managed separately, and management of large-scale knowledge can be performed without confusion.

Since the knowledge management system according to claim 8 further includes knowledge export means that extracts any part of a namespace, a knowledge tree, a knowledge entry, an entry attribute description, a parent-child relationship link constituting the knowledge management system to create a knowledge management subset, and exports the knowledge management subset to another knowledge management system, it is possible to exchange contents between the knowledge management systems and to construct the knowledge management system on a cloud separated from a company.

Since the knowledge management system according to claim 9 further includes knowledge import means that imports the knowledge management subset extracted by the knowledge export means or the knowledge management subset from a separately constructed knowledge management system, and reconfigures a namespace, a knowledge tree, a knowledge entry, an entry attribute description, and a parent-child relationship link, a part or all of the knowledge management system prepared on the cloud can be taken into its own knowledge management system.

Furthermore, if necessary, a part or all of the knowledge management system can be ported to another network.

Since the knowledge management system according to claim 10 further includes user authority management means that manages execution authority for creating, editing, deleting, and referring functions of each of the namespace, the knowledge tree, the knowledge entry, the knowledge entry attribute category, the knowledge entry attribute description, and the parent-child relationship link for each user, it is possible to prevent the system from being damaged by an unskilled user. In addition, by limiting a range of reference by the user, it is possible to hold knowledge that should be kept secret.

Since the knowledge management system according to claim 11 further includes knowledge browsing means that browses a parent-child relationship between the knowledge entries and contents of a knowledge attribute description of the knowledge entry, knowledge browsing according to a hierarchical structure is possible.

Since the knowledge management system according to claim 12 further includes knowledge inquiry receiving means that receives an inquiry about recorded and managed contents and a knowledge inquiry response means that responds to contents of the inquiry in the knowledge management system, accessibility is improved by automating search for necessary information.

Since the knowledge management system according to claim 13 further includes search scope management means that manages a creation user of each of the namespace, the knowledge tree, the knowledge entry, the entry attribute description, the parent-child relationship link, and excludes a part of the knowledge management system created by a specific user or user group from a search target range of the browsing and the knowledge inquiry or, conversely, sets only a part of the knowledge management system created by a specific user or user group as a search target range of the browsing and the knowledge inquiry, appropriate information can be obtained by excluding an inappropriate target from a search range or limiting a search target to a specific area.

DESCRIPTION OF EMBODIMENTS

Figure 1:
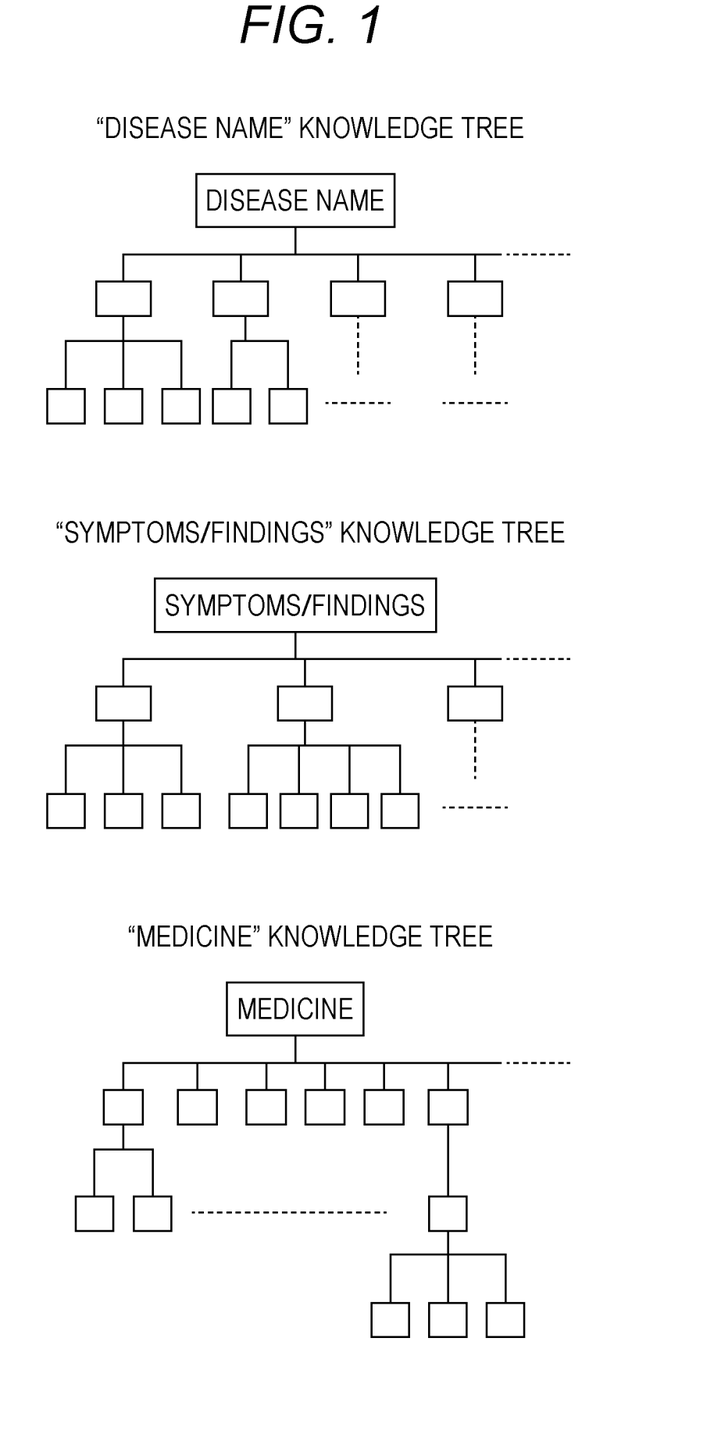
FIG. 1 is an example of a knowledge tree group, and is a schematic diagram of a medical knowledge tree group. It consists of knowledge trees of a disease name, symptoms/findings, a medicine name, etc.

In FIG. 1, an outline of a knowledge recording system of the present invention will be described taking medical knowledge as an example.

As knowledge trees, "disease", "symptoms, examination findings", "medicine", and the like are exemplified.

In addition, "treatment", "insurance claim", and the like can be considered.

Each knowledge tree is made up of a set of knowledge entries connected in a parent-child relationship.

Knowledge tree group management means manages a knowledge tree in the knowledge tree group.

Figure 2:
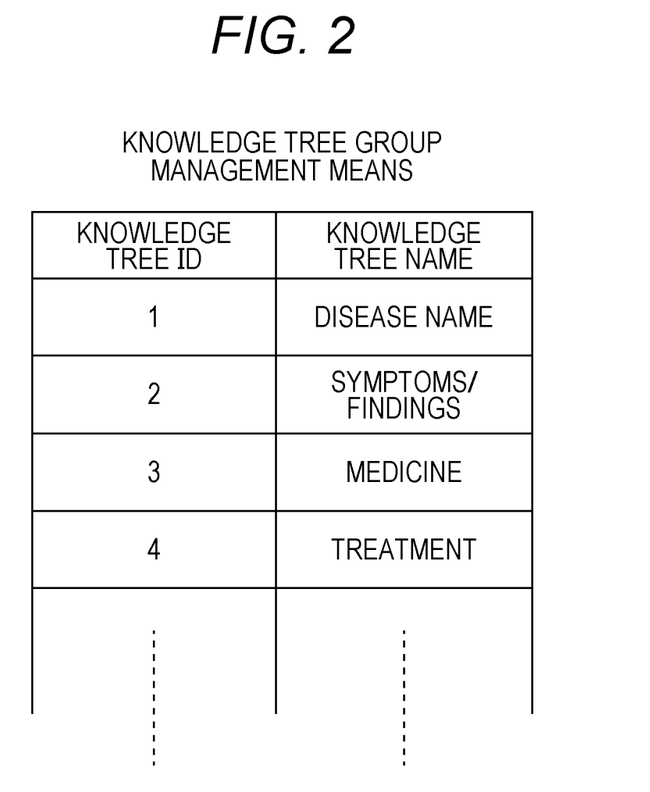
FIG. 2 is an example of knowledge tree group management means. A knowledge tree ID and a knowledge tree name of each knowledge tree in the knowledge tree group are managed in the form of a master table.

FIG. 2 shows an example of the knowledge tree group management means, which manages a knowledge tree ID and a knowledge tree name in the group in the form of a master table.

Figure 3:
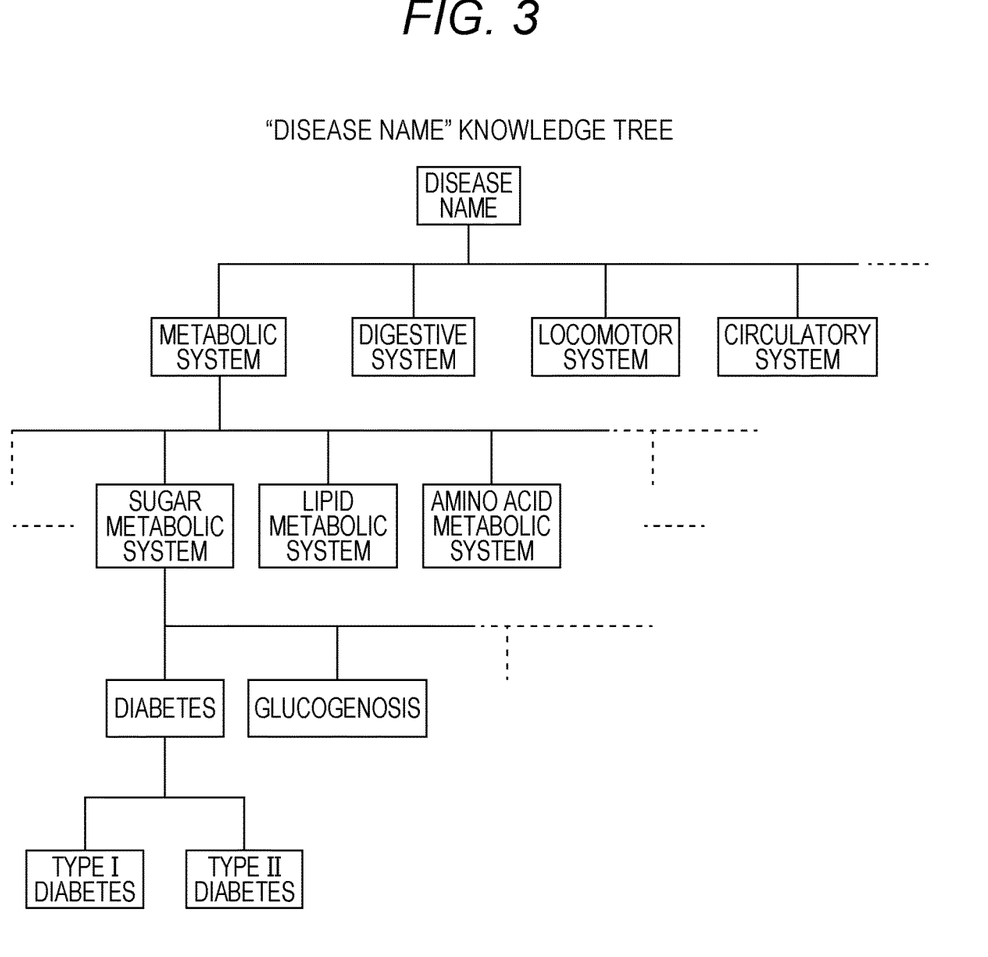
FIG. 3 illustrates a part of a knowledge entry group constituting the disease name knowledge tree as an example of the knowledge tree group.

FIG. 3 illustrates, as an example of the knowledge tree, a knowledge entry group forming a "disease name" knowledge tree.

The knowledge entry group of "disease name" is first divided into large classifications such as "metabolic system", "digestive system", "locomotor system", and "circulatory system". Each of the large classifications is divided into middle classifications such as "sugar metabolic system", "lipid metabolic system", and "amino acid metabolic system" in "metabolic system". The middle classification "sugar metabolic system" is further divided into small classifications such as "diabetes" and "glycogenosis".

The small classification "diabetes" includes "type I diabetes" and "type II diabetes".

Here, "type I diabetes" and "type II diabetes" which correspond to ends and leaves of the knowledge tree are specific disease names. The common attributes are grouped into knowledge entry groups, such as a small classification, a middle classification, and a large classification, which correspond to branches, and these function as a container-type knowledge entry containing a lower classification and a disease name of a leaf.

Here, large, medium, and small classification hierarchies are used, but depending on an area, a deeper hierarchy may be used, or a shallow hierarchy may be sufficient. Here, classification criteria based on pathology are used, but in addition, there are also classification criteria for each part such as "nucha", "neck", and "upper limb", and classification criteria for etiology such as "inflammation system", "tumor system", "infectious system", and "genetic system". As described above, expression may fluctuate depending on the classification criteria, but in any case, once a manager of the knowledge management system determines the classification criteria, fluctuation of the expression thereafter will disappear. In short, the manager of the knowledge management system may set the classification criteria according to a purpose. In some cases, a plurality of knowledge trees having different classification criteria may coexist.

Figure 4:
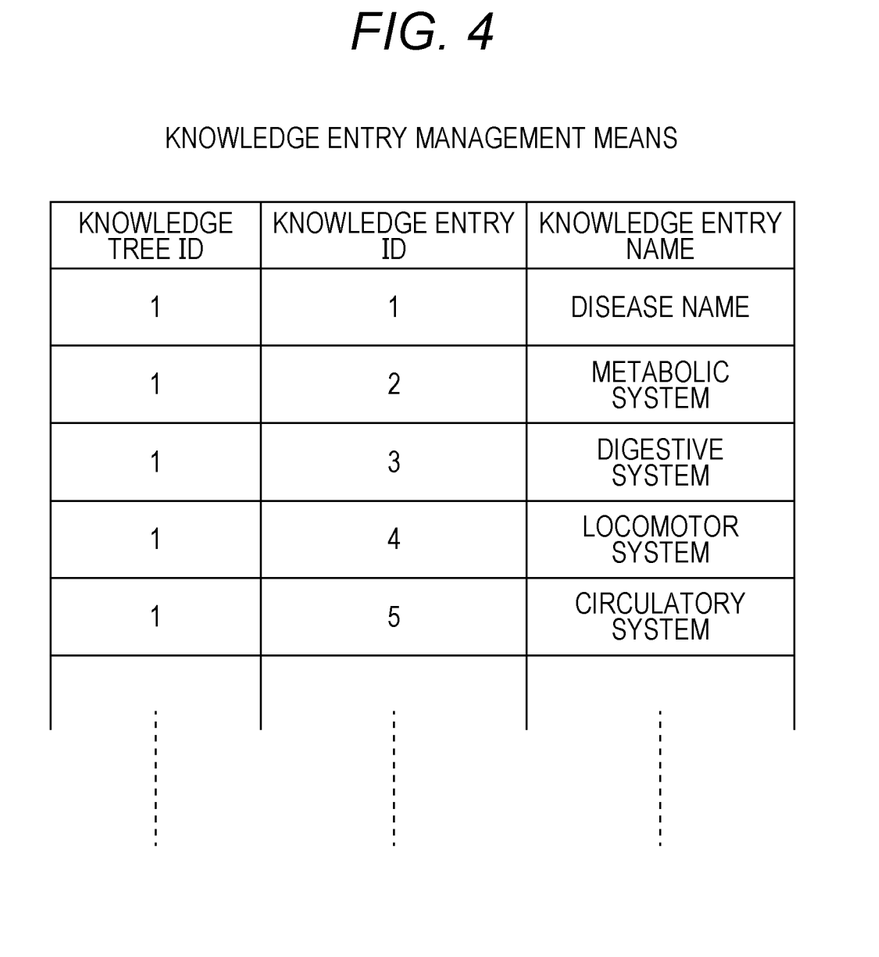
FIG. 4 is an example of knowledge entry management means, which manages the knowledge tree ID, a knowledge entry ID, and a knowledge entry name in the form of a master table for the knowledge entry group constituting the disease name knowledge tree.

FIG. 4 shows an example of knowledge entry management means.

A knowledge entry ID in the knowledge tree is managed in the knowledge tree group in the form of a master table.

A knowledge entry name must be unique within a knowledge tree to which it belongs. If it belongs to different knowledge trees, mutual distinction is made by the knowledge tree IDs defined as shown in FIG. 2, so that the same knowledge entry name is also allowed.

Note that, in this diagram, the knowledge entries in the knowledge tree group are centrally managed regardless of the knowledge tree to which they belong, but in some cases, a master table may be created separately for each knowledge tree to manage the knowledge entries.

If a unique knowledge entry name is used throughout the knowledge tree group regardless of the knowledge tree to which it belongs, a knowledge tree ID in a first column in FIG. 4 is unnecessary.

Figure 5:
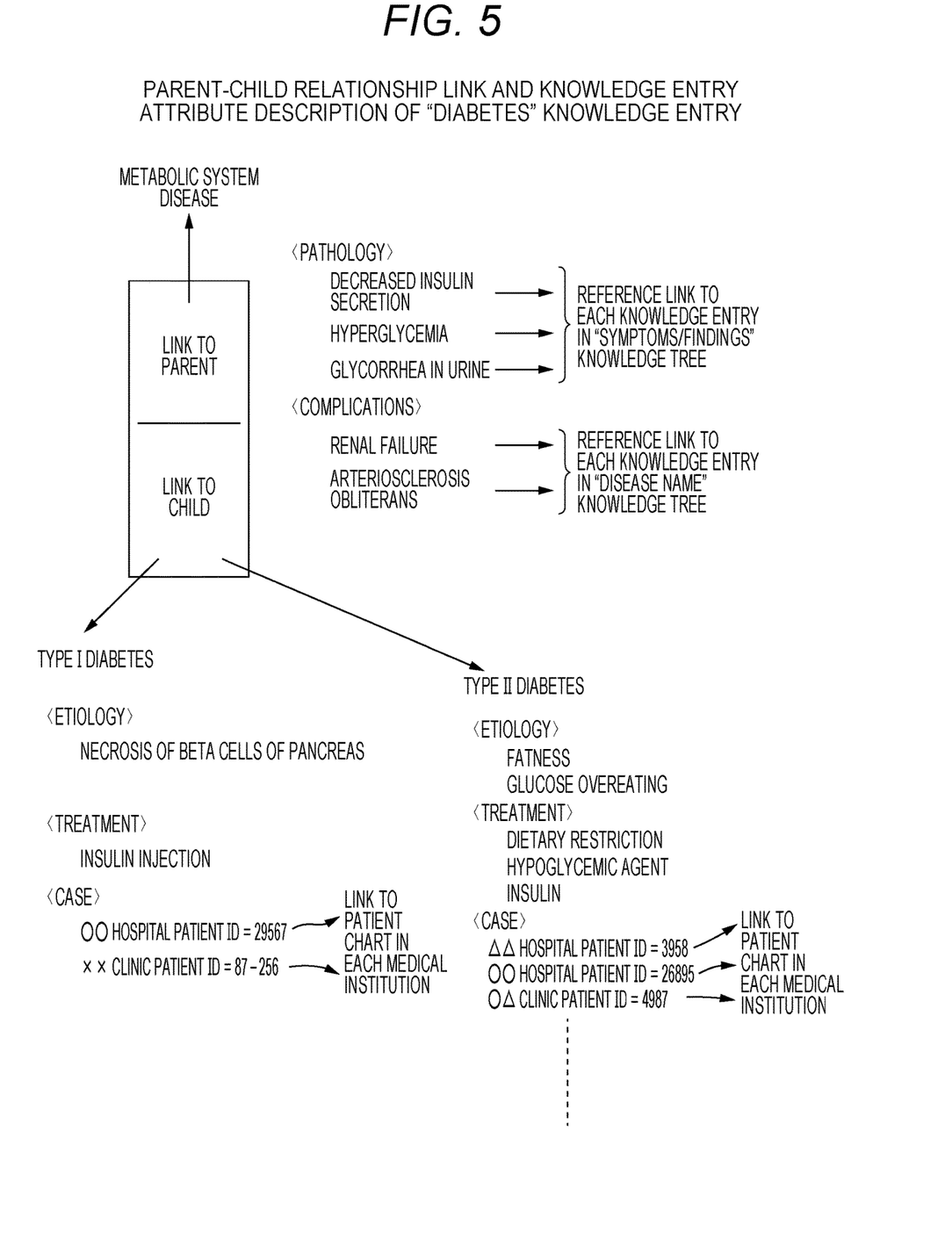
FIG. 5 illustrates a parent-child relationship link and a knowledge entry attribute description, taking diabetes which is one of the knowledge entries constituting the disease name knowledge tree as an example.

FIG. 5 illustrates a parent-child relationship link and an attribute description, taking as an example "diabetes" knowledge entry which is one of container-type knowledge entries and "type I diabetes" and "type II diabetes" which correspond to leaves thereof.

"Diabetes" has a link to "metabolic system" as a parent knowledge entry, and has links to "type I diabetes" and "type II diabetes" as child knowledge entries.

An attribute description category of "diabetes" includes <pathology>, <complications>, and the like.

<Pathology> includes decreased insulin secretion, hyperglycemia, glycorrhea in urine, and the like.

Each item of <pathology> is made up of a reference link to a corresponding knowledge entry in "symptoms/findings" knowledge tree which is a separate knowledge tree.

By doing so, attribute description is performed using a controlled vocabulary like a thesaurus, and fluctuation in expression can be suppressed.

Of course, here, the attribute description may be directly made using a character string or may set up a link to a document as in the conventional case. However, it is not preferable since fluctuation cannot be suppressed and a function of the reference link described later cannot be utilized.

<Complications> include "renal failure" and "arteriosclerosis obliterans". Reference links to these complications are reference links to the knowledge entry in the same "disease name" knowledge tree.

Etiology of "type I diabetes" is rapid necrosis of beta cells of pancreas, and supplementation by insulin injection is the only treatment.

On the other hand, etiology of "type II diabetes" is due to fatness, glucose overeating, and the like, and treatment is dietary restriction, oral administration of a hypoglycemic agent, and finally insulin injection.

As described above, "type I diabetes" and "type II diabetes" differ in <etiology> and <treatment>, but other <pathology> and <complications> are common to both. The both are described in "diabetes" which is the parent knowledge entry.

In "type I diabetes" and "type II diabetes" corresponding to the leaves, even if only <etiology> and <treatment> are described, attribute descriptions such as <pathology> and <complications> of "diabetes" corresponding to the parent knowledge entry, and furthermore, attribute descriptions such as the metabolic disease and the like in an upper part are inherited.

In this way, by grouping the common attribute description into the parent knowledge entry, the child knowledge entry needs only a minimal attribute description. Although the attribute description of the knowledge entry may be individually viewed while following the parent-child relationship, if knowledge entry attribute description inheriting means is used to inherit and display entire attribute description of a knowledge entry corresponding to a parent of the knowledge entry, it is easy to grasp the attribute description comprehensively.

The attribute description inherited from the parent in a knowledge entry attribute category unit may be the knowledge entry attribute description of the child knowledge entry as it is. However, if there is a knowledge entry attribute description different from the attribute description inherited to the knowledge entry attribute category of the child knowledge entry, the knowledge entry attribute description of the child knowledge entry overwrites or adds to the knowledge entry attribute description inherited from the parent. This overwritten or added knowledge entry attribute description is further inherited to a knowledge entry of a grandchild or below.

A proper use of the overwriting or the additional writing may be appropriately set by the knowledge entry attribute description inheriting means as appropriate.

Although it is possible to perform the attribute description without using the attribute category, the use of the attribute category makes it easy to grasp inheritance for each attribute category by the knowledge entry attribute description inheriting means. In addition, it is more useful because the attribute description can be easily overwritten and added.

<Case> In the knowledge entry attribute category, a reference link to a chart of a case having the disease name is recorded.

Thereby, a patient record of the disease can be directly referred to. The reference link to the case chart may be in any format as long as it allows access to case information, such as medical institution ID+patient ID, URL of a patient chart, and a name of a patient chart file. Further, a document ID of the patient chart, for example, document type+creation date may be included. In addition, a knowledge entry attribute category such as <literature> may be provided to describe a link to a related book, file, or a document on the Web (external document reference means).

Figure 6:
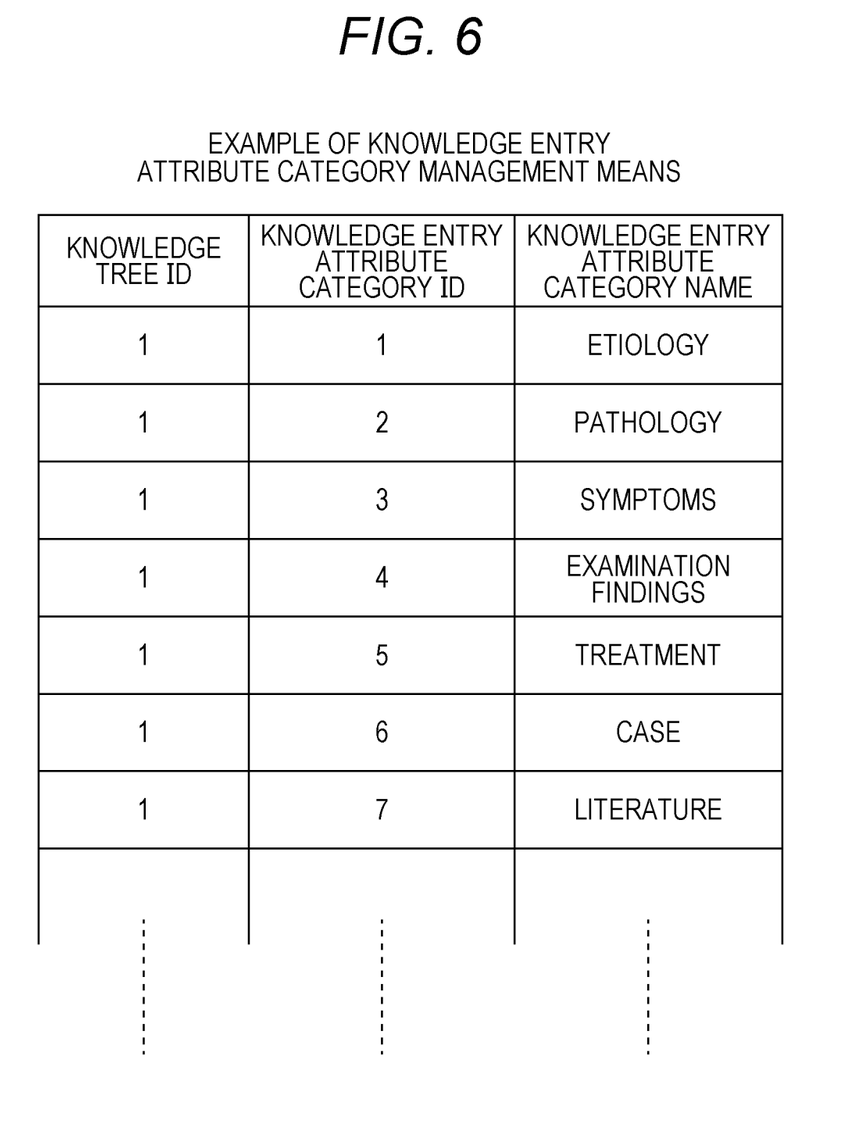
FIG. 6 is an example of knowledge entry attribute category management means. The knowledge tree ID, a knowledge entry attribute category ID, and a knowledge entry attribute category name are managed in the form of a master table.

FIG. 6 shows an example of knowledge entry attribute category management means.

A knowledge entry attribute category ID in the knowledge tree is managed in the knowledge tree group in the form of a master table.

A knowledge entry attribute category name must be unique within a knowledge tree to which it belongs. If it belongs to different knowledge trees, mutual distinction is made by their knowledge tree IDs, so that the same knowledge entry attribute category name is also allowed.

Note that, in this diagram, the knowledge entry attribute categories in the knowledge tree group are centrally managed regardless of the knowledge tree to which they belong, but in some cases, a master table may be created separately for each knowledge tree to manage the knowledge entry attribute categories.

If a unique knowledge entry attribute category name is used in the knowledge tree group, a knowledge tree ID in a first column is unnecessary. Further, it is also possible to write a knowledge entry attribute category directly to a knowledge entry corresponding to a root of a knowledge tree and make it inherit to the following without using the knowledge entry attribute category management means as described in the diagram. However, this method is not preferable especially in a large-scale knowledge management system since a procedure is more complicated than the master table method when automating search or the like. In addition, there is a method in which a user freely defines a knowledge entry attribute category for each knowledge entry. However, duplication and fluctuation of descriptions are likely to occur, and similarly, it is not preferable.

Figure 7:
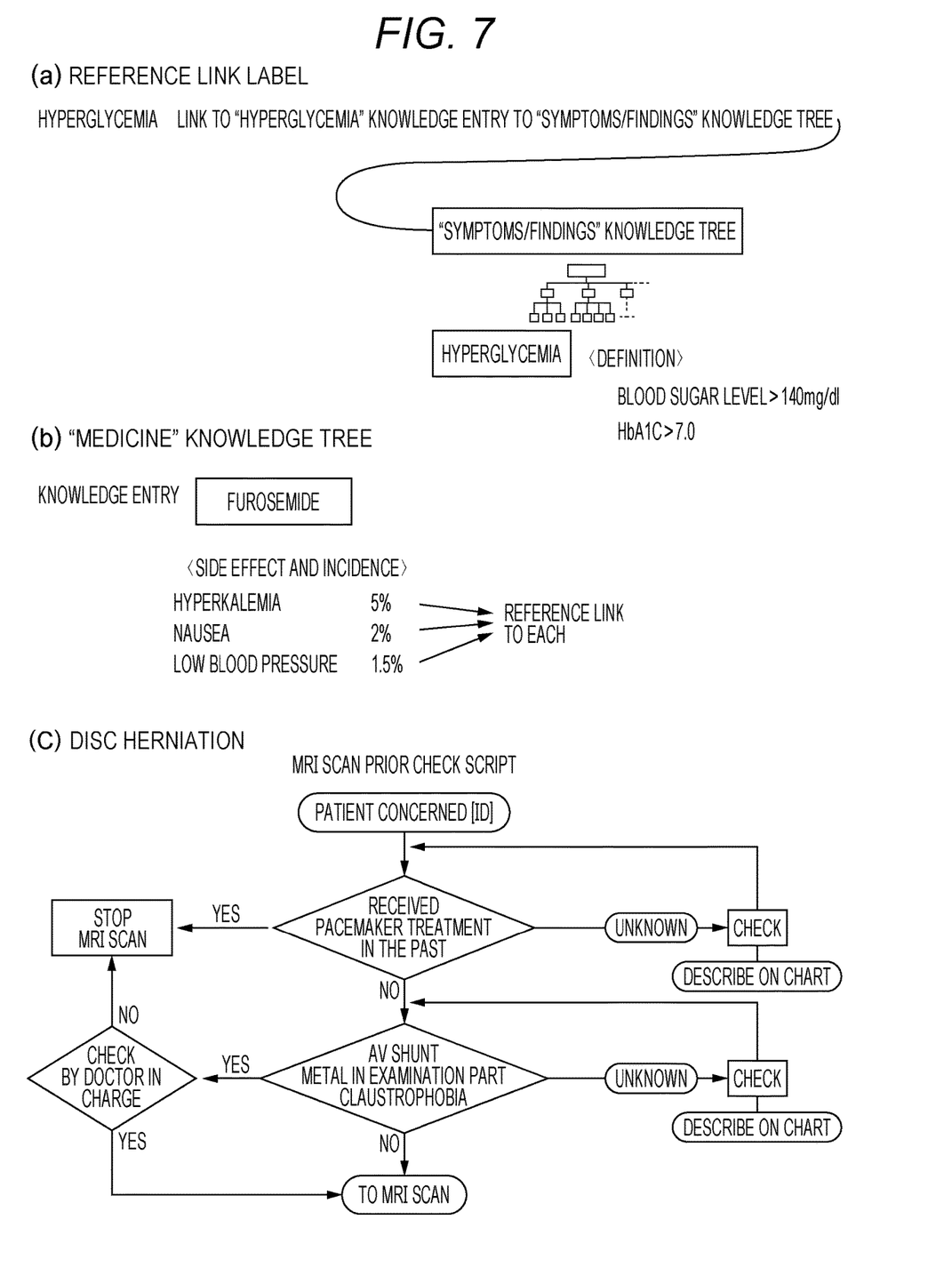
FIG. 7 is an explanatory diagram of reference characteristic management means of a reference link constituting an entry attribute description. (a) a label and a reference link example to a knowledge entry item or a definition knowledge attribute category in the knowledge entry item, (b) a reference link example that manages reference strength such as frequency of occurrence in the reference link, and (c) a reference link example that defines a series of scripts to be executed.

FIG. 7 illustrates various embodiments of a reference link.

FIG. 7(a) is an example illustrating a structure of {hyperglycemia} which is a reference link in <pathology> of "diabetes" in FIG. 5.

It consists of "hyperglycemia" which is a label and a link to "hyperglycemia" which is a knowledge entry in "symptoms/findings" knowledge tree.

In some cases, it may be linked to <definition> which is a knowledge entry attribute category in "hyperglycemia". The label is a display content at the time of browsing or the like.

As in this example, a knowledge entry name at a link destination may be used as it is, but for ease of reading, "hyperglycemia blood sugar level >140 mg/dl" etc. may be used.

In this way, even if there is no step of individually referring to the link destination, an outline can be easily looked through and grasped.

FIG. 7(b) shows a reference link of <side effect and incidence> knowledge entry attribute category in "furosemide" knowledge entry in "medicine" knowledge tree.

A first row consists of a label of "hyperkalemia", reference strength of "5%", and a reference link to "hyperkalemia" knowledge entry in "symptoms/findings" knowledge tree.

Even with various side effects, incidences are not uniform. By having information on frequency of occurrence as the reference strength, an order of side effects to be considered becomes clear.

Further, the frequency of occurrence is a priori probability referred to as a Bayesian probability, and is useful for Bayesian estimation for estimating a causative medicine when a plurality of medicine administrations causes a side effect.

FIG. 7(c) shows, in "disc herniation" knowledge entry in a disease name knowledge tree, and in <examination> knowledge entry attribute category, a flowchart of a check script at the time of execution together with "MRI" label and a reference link to "MRI" knowledge entry in "examination" knowledge tree.

As described above, the Bayesian estimation is performed to help response by having reference characteristic management means that manages reference strength and a script executed for the reference, and safety of medical treatment is improved by eliminating a check mistake. Further, by making the reference strength variable in the reference characteristic management means in accordance with observation frequency in a case, it is possible to perform the Bayesian estimation or the like more suited to a situation.

Further, for example, when "fever" is described as <symptom> of a certain patient, polarity of "presence/absence" of the fever may be managed using the reference characteristic management means in a reference link to "fever" knowledge entry in "symptoms/findings" knowledge tree. In addition, a reference link to the patient's chart may be simultaneously established from fever" knowledge entry. In this way, a request such as a proportion of patients with fever in Tokyo or a list of patients with fever can be easily answered.

Although the knowledge tree group shown in FIG. 1 is related to the medical treatment, there are countless other areas in which knowledge should be described, such as art and industry.

It is essential that the knowledge tree name is unique and does not overlap with other knowledge tree names. However, if the same knowledge tree name is used in another area that is not involved, a troublesome problem is caused.

Figure 8:
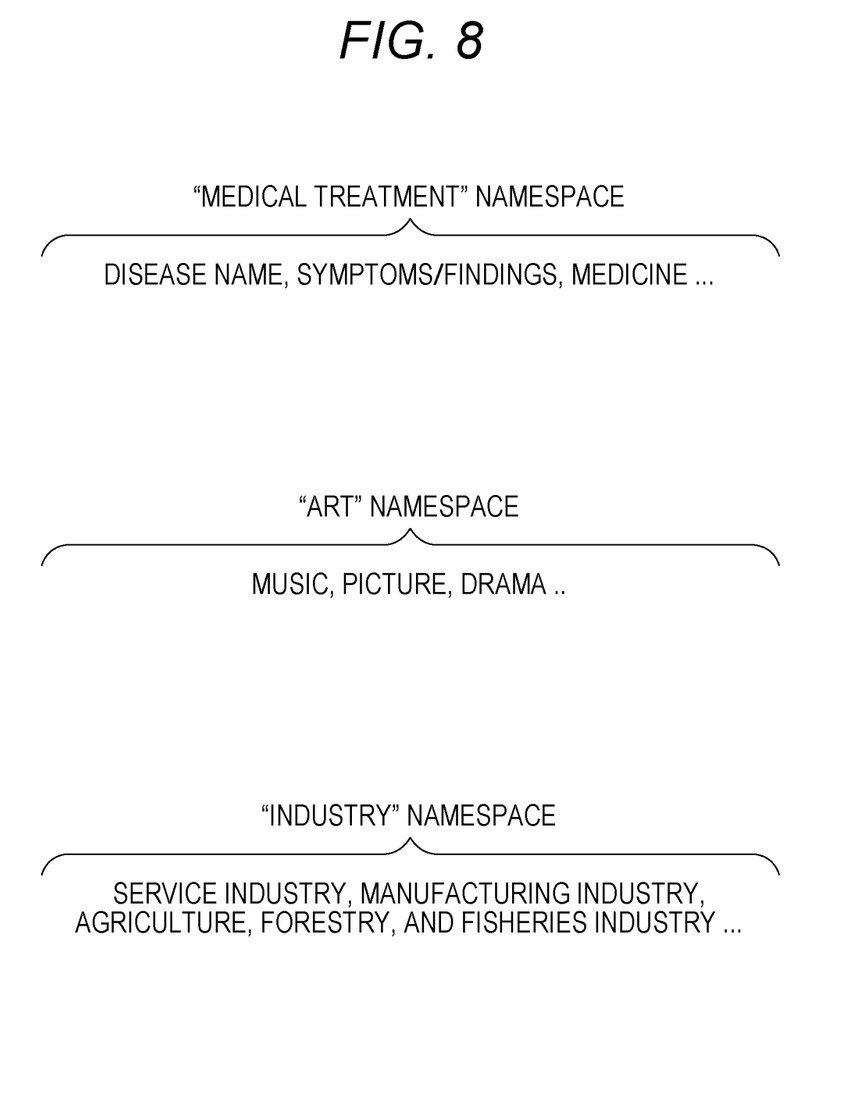
FIG. 8 is an explanatory diagram of namespace management.
Figure 9:
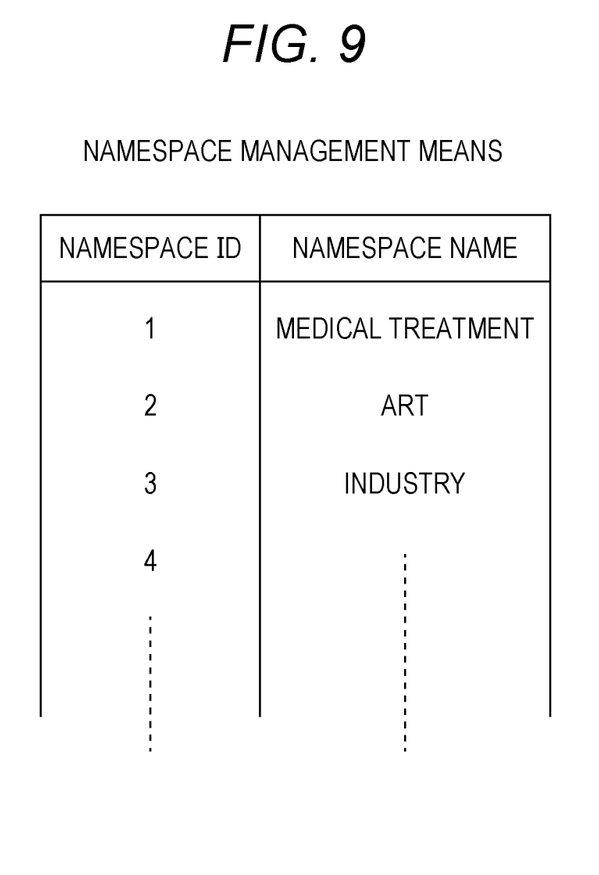
FIG. 9 is an explanatory diagram of namespace management means.

To avoid this problem, a namespace is set for each area as shown in FIG. 8. As a result, the knowledge tree name becomes namespace+knowledge tree name, so that knowledge tree names in other areas can be completely separated. FIG. 9 shows an example of managing a namespace ID and a namespace name in the form of a master table (namespace management means). If necessary, the namespace ID is added to first columns in FIGS. 2, 4, and 6, so that management of large-scale knowledge can be performed without confusion.

Figure 10:
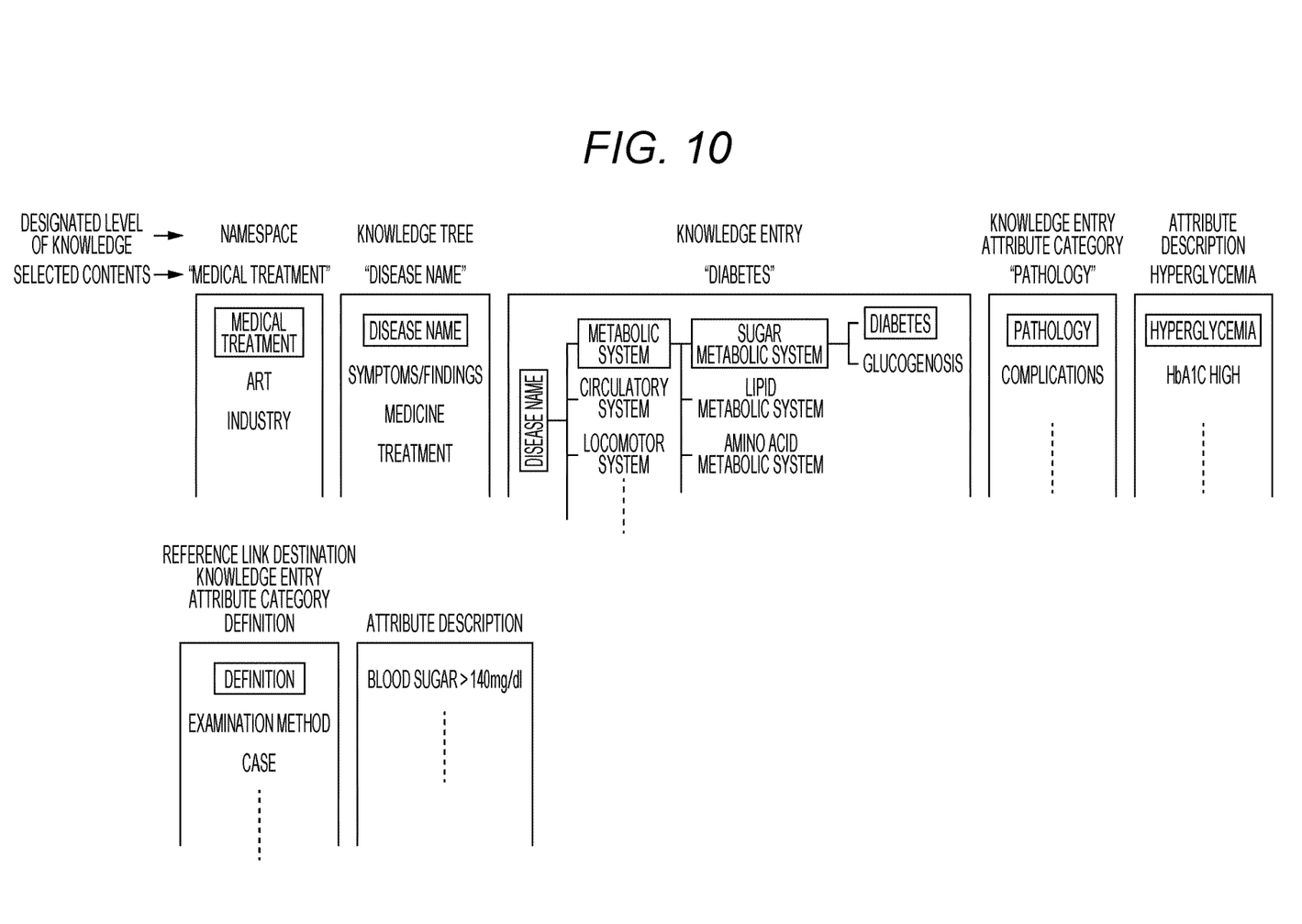
FIG. 10 is a screen configuration example of knowledge browsing means.

FIG. 10 is an example of knowledge browsing means.

First, "medical treatment" is selected here from a namespace list in a first column from the left.

As a result, names of a knowledge tree group belonging to "medical treatment" namespace are listed in a second column. Here, when "disease name" knowledge tree is selected, a list of large classifications such as metabolic system and circulatory system is first shown. When "metabolic system" is selected, a list of middle classifications therebelow such as "sugar metabolic system" and "lipid metabolic system" is shown.

When "sugar metabolic system" is selected, "diabetes", "glycogenosis", and the like which are small classifications therebelow are listed.

When "diabetes" is selected, <pathology>, <complication>, and the like which are knowledge entry attribute categories are shown.

When <pathology> is selected, reference links such as "hyperglycemia" and "HbA1c high" which are attribute descriptions constituting <pathology> are shown.

When "hyperglycemia" is selected, <definition>, <examination method>, and the like which are "hyperglycemia" knowledge entry attribute categories in "symptoms/findings" knowledge tree as a reference link destination are shown.

When <definition> is selected, contents of the knowledge entry attribute category are shown.

As shown in FIG. 10, it is useful to proceed with browsing by hand, but it is even more useful to make inquiries such as search to a knowledge management system, perform processing such as set operation and logical operation on a search result, and display the result or download it to a file.

It is efficient if a series of inquiry procedures can be written by a script or the like and automatically processed in order (knowledge inquiry receiving means and knowledge inquiry response means).

The knowledge management system of the present invention is assumed to be built on a cloud.

However, some companies and hospitals operate without connecting to the Web for security reasons. In such a case, knowledge export means that extracts any part of a namespace, a knowledge tree, a knowledge entry, an entry attribute description, and a parent-child relationship link constituting a knowledge management system to create a knowledge management subset and exports it to another knowledge management system and knowledge import means that imports the knowledge management subset extracted by the knowledge export means or the knowledge management subset from a separately constructed knowledge management system and integrates and reconfigures the namespace, knowledge tree, knowledge entry, entry attribute description, and parent-child relationship link into its own knowledge management system are provided. Thereby, a part or all of the knowledge management system maintained on the cloud can be incorporated into its own internal knowledge management system.

In addition, if an excellent knowledge management system can be built in-house and there is another purchaser, a part or all of the knowledge management system can be ported to the other by a similar procedure.

Since an amount of information handled by the knowledge management system is enormous, creation requires cooperation of many people.

Depending on authority and skills of people involved, it is indispensable to set authority for creating, editing, deleting, referring functions etc. of each of the namespace, knowledge tree, knowledge entry, knowledge entry attribute category, knowledge entry attribute description, and parent-child relationship link (user authority management means).

As a result, it is possible to prevent the knowledge management system from being damaged by a user with poor understanding. In addition, by limiting a range of reference by a user, it is possible to hold knowledge that should be kept secret.

The knowledge management system of the present invention is implemented in a database, such as a graph database such as Neo4j, a relational database (RDB) that has been frequently used, and a key value store (KVS) that has recently attracted attention as a big data processing method.

Although any implementation is possible, each has its own features/disadvantages.

First of all, Neo4J is good at setting and displaying a network-like graph relationship, but it cannot be said that processing speed is always fast in large-scale processing, and it is not suitable for a large knowledge management system.

RDB can implement the knowledge management system of the present invention by performing a parent-child relationship link and a knowledge entry attribute description for each row of a relation under management of a master table such as a namespace, a knowledge tree, a knowledge entry, and a knowledge entry attribute category.

It has a high degree of freedom in searching, has a complete query language such as SQL, and has a lot of traditional software assets, so implementation using RDB will be realistic.

KVS consists of a set of one to several items of data (columns) and key data. Therefore, a wide variety of free searches are inferior to RDB. However, for processing a large amount of data, distributed processing such as MapReduce is possible at high speed.

The list of cases in <case> in FIG. 5, <case> of "hyperglycemia" in "symptoms/findings" knowledge tree, and the like will have an enormous list of cases as soon as an electronic chart is actually operated. A frequency distribution of a single attribute can be easily obtained using any method. However, when a frequency made of multiple factors is calculated from large-scale case data such as "What is frequency of cases of diabetic patients with HbA1c exceeding 10 and urine protein of 2+ or more?", it sometimes exceeds processing capacity of RDB. In such a case, it is necessary to perform a set operation among a diabetic patient list, a patient list of HbA1c >10, and a patient list of urine protein >2+. In such a case, distributed processing by MapReduce of KVS is extremely effective.

Furthermore, in the knowledge management system of the present invention, since the knowledge entries have a hierarchical structure, for example, when searching for a patient list of "fever" is desired, it is possible to extend a search range to a patient list of "remittent fever" or "continuous fever" which is a subordinate concept of "fever" as necessary.

As described above, the knowledge management system of the present invention can adopt any database implementation method, and a combination of performing a basic part with RDB and processing of a case list and the like with KVS will be most effective.

The user authority management means sets authority for each user regarding access to the knowledge management system, but this alone is not sufficient. There is an instance in which followers of a conflicting doctrine repeatedly overwrite to deny each other's writings. As a solution to such a case, search scope management means that excludes, viewed from a certain user, writing of another specific user from being searched is used. Thereby, a peaceful solution can be achieved.

The same "chest pain" is likely to be a myocardial infarction if it occurs in a hospital specializing in heart disease, but is likely to be a rib fracture in an orthopedic outpatient department. As described above, a prior distribution of frequency of occurrence of symptoms/findings often differs depending on a clinical department. In such a case, it is useful to set a search scope by gathering similar clinical departments, medical institutions, and regions.

Although the embodiment has been described above, the specific configuration of the present invention is not limited to the above-described embodiment, and any change in design or the like without departing from the gist of the invention is included in the present invention.

For example, in the present application, medical treatment is taken as an example, and besides, similar discussions are possible on education, personnel affairs, etc. Classification criteria such as a knowledge tree and a knowledge entry, and setting of a knowledge entry attribute category must be carefully defined by an experienced designer. The classification criteria in the present application are only examples. Once the classification criteria are defined, fluctuation of the following description is minimized.

The invention claimed is:

1. A knowledge management system, the system comprising:
   a cloud server; and
   one or more knowledge databases, wherein the cloud server and the one or more knowledge databases are in network communication with one another, wherein the cloud server and the one or more knowledge databases are configured to execute knowledge tree group management means that manages at least one knowledge tree and knowledge entry management means that manages at least one knowledge entry existing for each of the knowledge trees, wherein
   each of the knowledge entries includes a knowledge entry attribute description describing an attribute related to the knowledge entry, and a knowledge entry parent-child relationship link describing a parent-child relationship with another knowledge entry of the knowledge tree, and
   the knowledge entry attribute description includes a reference link to a knowledge entry belonging to a different or an identical knowledge tree or to an entry attribute description of the knowledge entry.

2. The knowledge management system according to claim 1, further comprising knowledge entry attribute description inheriting means that inherits an entry attribute description of a parent knowledge entry to an entry attribute description of a child knowledge entry in the parent-child relationship.

3. The knowledge management system according to claim 1, further comprising reference characteristic management means that manages reference strength and a script to be executed upon reference in the reference link.

4. The knowledge management system according to claim 3, wherein the reference strength is changed according to observation frequency in the reference characteristic management means.

5. The knowledge management system according to claim 1, further comprising external document reference means that refers to an external document or an external document group related to the entry attribute description in the reference link.

6. The knowledge management system according to claim 1, further comprising namespace management means that manages a plurality of knowledge tree groups by dividing it by a namespace in the knowledge tree group management means.

7. The knowledge management system according to claim 1, further comprising knowledge export means that extracts any part of a namespace, a knowledge tree, a knowledge entry, an entry attribute description, a parent-child relationship link constituting the knowledge management system to create a knowledge management subset, and exports the knowledge management subset to another knowledge management system.

8. The knowledge management system according to claim 1, further comprising knowledge import means that imports the knowledge management subset extracted by the knowledge export means or the knowledge management subset from a separately constructed knowledge management system, and reconfigures a namespace, a knowledge tree, a knowledge entry, an entry attribute description, and a parent-child relationship link.

9. The knowledge management system according to claim 1, further comprising user authority management means that manages execution authority for creating, editing, deleting, and referring functions of each of a namespace, the knowledge tree, the knowledge entry, a knowledge entry attribute category, the knowledge entry attribute description, and the parent-child relationship link for each user.

10. The knowledge management system according to claim 1, further comprising knowledge browsing means that browses a parent-child relationship between the knowledge entries and contents of a knowledge attribute description of the knowledge entry in the knowledge management system.

11. The knowledge management system according to claim 1, further comprising: knowledge inquiry receiving means that receives an inquiry about recorded and managed contents; and a knowledge inquiry response means that responds to contents of the inquiry in the knowledge management system.

12. The knowledge management system according to claim 1, further comprising search scope management means that manages a creation user of each of a namespace, the knowledge tree, the knowledge entry, the entry attribute description, the parent-child relationship link, and excludes a part of the knowledge management system created by a specific user or user group from a search target range of a browsing and a knowledge inquiry or, conversely, sets only a part of the knowledge management system created by a specific user or user group as a search target range of the browsing and the knowledge inquiry.

13. The knowledge management system according to claim 1, further comprising knowledge entry attribute category management means that manages the knowledge entry attribute description by dividing it into categories.

* * * * *